(12) United States Patent
Liau

(10) Patent No.: US 6,478,286 B1
(45) Date of Patent: Nov. 12, 2002

(54) RIVETED STRUCTURE FOR A PULLEY SEAT

(76) Inventor: Wan-Lai Liau, 3rd Floor, No. 6, Chung Yang Rd., Nan Kang District, Taipei (TW)

( * ) Notice: Subject to any disclaimer, the term of this patent is extended or adjusted under 35 U.S.C. 154(b) by 70 days.

(21) Appl. No.: 09/722,201

(22) Filed: Nov. 24, 2000

(51) Int. Cl.[7] .................................................. B66D 3/04
(52) U.S. Cl. ........................................ 254/390; D8/360
(58) Field of Search ................................ 254/390, 405, 254/409, 413; D8/360

(56) References Cited

U.S. PATENT DOCUMENTS

| | | | | |
|---|---|---|---|---|
| D15,216 S | * | 8/1884 | Rose | D8/360 |
| D16,980 S | * | 11/1886 | Kuhn | D8/360 |
| D19,570 S | * | 1/1890 | Palmer | D8/360 |
| D28,397 S | * | 3/1898 | Ocumpaugh | D8/360 |
| 793,918 A | * | 7/1905 | Clark | 254/390 |
| 1,634,773 A | * | 7/1927 | Coventry | 254/390 |
| 4,079,916 A | * | 3/1978 | Einhorn et al. | 254/390 |

* cited by examiner

Primary Examiner—Emmanuel Marcelo
(74) Attorney, Agent, or Firm—Pro-Techtor International Services

(57) ABSTRACT

A riveted structure for a pulley seat, comprises a base which is pivotally connected to the pulley and is provided with two apertures on the surface of the two sides thereof, respectively; and a panel which is provided with an elongate through-hole at the center thereof, and which can cover the base, such that the pulley passes through the through-hole and is exposed outside; wherein two rivets are integrally formed on the two sides of the panel, which are passed through the two apertures and then, pressed, whereby the two rivets are deformed and positioned on the underside of the apertures, thereby providing rigid connection between the panel and base and no riveted trace exists therebetween.

1 Claim, 6 Drawing Sheets

RIVETED STRUCTURE FOR A PULLEY SEAT

BACKGROUND OF THE INVENTION

The present invention relates to a riveted structure, more particularly, to a riveted structure for a pulley seat which provides a smooth surface for a panel when the panel is riveted to a base.

Referring to FIGS. 5, 6, 7, and 8, a conventional pulley structure, which was filed for a Utility Mole in R.O.C under application No. 88206870, is shown. Said structure discloses a seat A which is provided with an elongate slot A1 at the upper portion thereof for providing pivotal connection of a pulley B. Two holes A2, A3 are provided on a substrate at two the sides of the slot A1. A panel C having a through-hole C1 is provided with two apertures C2, C3 thereof Two rivets D1, D2 are provided for insertion into the holes A2, A3 and apertures C2 and C3 and then, are deformed and fixedly secured thereon by pressing them so that the panel C is fixed to seat A. However, the apertures C2, C3 on the panel C form a marked trace of the rivet connection on the periphery thereof, which is difficult, if not impossible, to remove even with a polishing treatment.

SUMMARY OF THE INVENTION

To overcome the drawbacks of the conventional riveted structure, an object of the present invention is to provide a riveted structure for a pulley seat which provides achieve a smooth surface for a panel when the panel is riveted to a base.

To achieve the object mentioned above, the present invention provides a riveted structure for a pulley seat comprising:

a base which is pivotally connected to the pulley and is provided with two apertures on the surface of the two sides thereof respectively; and a panel which is provided with an elongate through-hole at the center thereof, and which can cover the base, such that the pulley passes through the through-hole and is exposed outside;

characterized in that two rivets are integrally formed on the two sides of the panel, which are passed through the two apertures and then, pressed, whereby the two rivets are deformed and positioned on the underside of the apertures, thereby providing rigid connection between the panel and base and no riveted trace exists therebetween.

BRIEF DESCRIPTION OF THE DRAWINGS

The above objects and advantages of the present invention will become more apparent by the following detailed description of a preferred embodiment thereof in conjunction with the accompanying drawings, in which.

DETAILED DESCRIPTION OF THE PREFERRED EMBODIMENT

Figure 1:
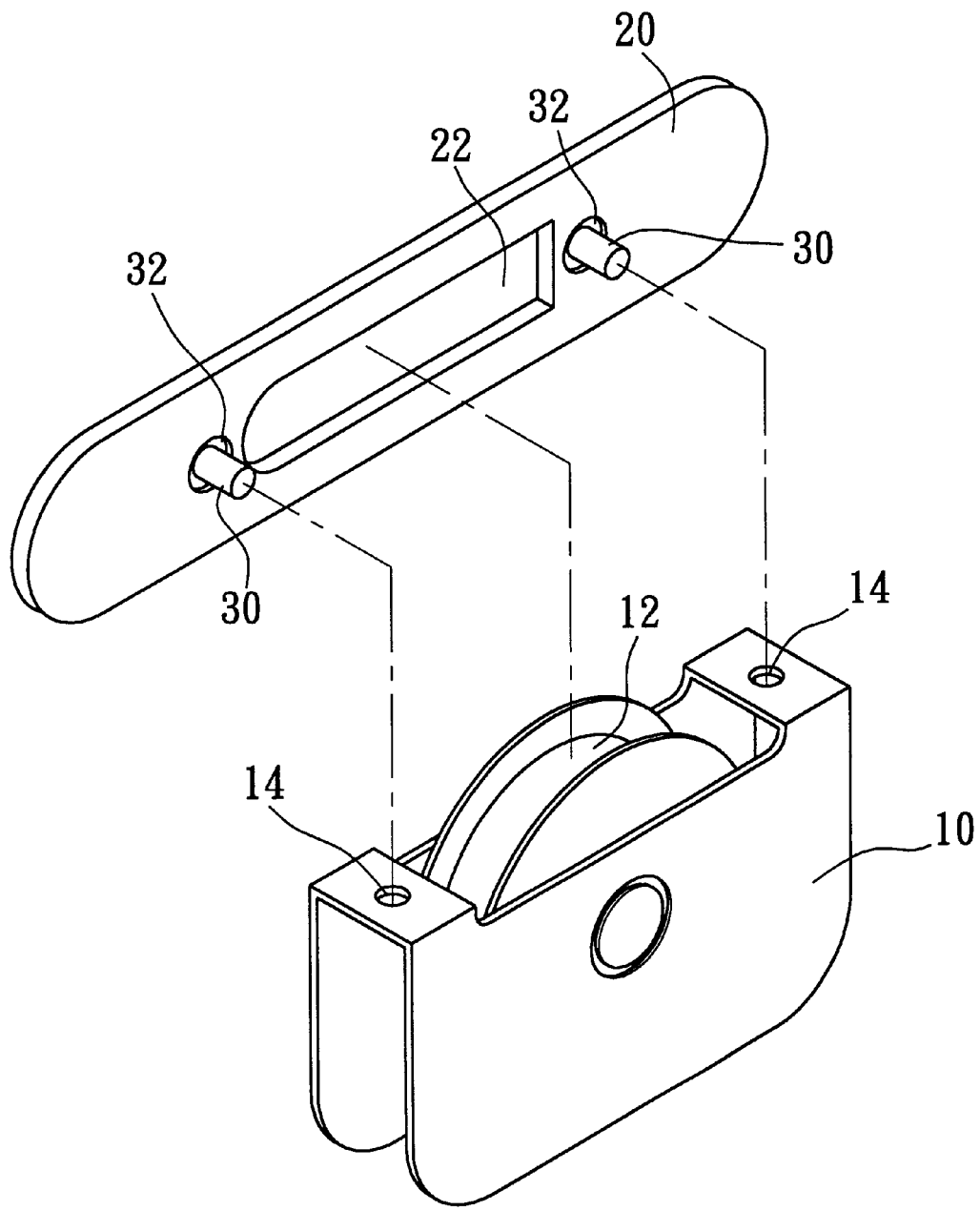
FIG. 1 shows an exploded view of the riveted structure for a pulley seat according to the present invention.

Referring now to FIGS. 1, 2, 3 and 4, the riveted structure for a pulley seat according to the present invention includes a base 10 and a panel 20. Said base 10 is pivotally connected to a pulley 12 and is provided with two apertures 14 (14) on the surface of the two sides thereof, respectively. Said panel 20 is provided with an elongate through-hole 22 at the center thereof. When the panel 20 covers the base 10, the pulley 12 passes through the hole 22 and is exposed outside. In addition, two rivets 30 (30) are provided on two sides of the panel 20. Most notably, around the two rivets 30 (30) is provided an annular recess 32 so that when the two rivets 30 (30) are respectively inserted into the two apertures 14(14) and then a pressure is applied to the two rivets 30(30), the squeezed material of the pressed and deformed rivets 30 (30) is filled into the recess 32. In this way, the connection between the panel 20 and base 10 is rigid and there is not a marked trace of the rivet connection.

Figure 2:
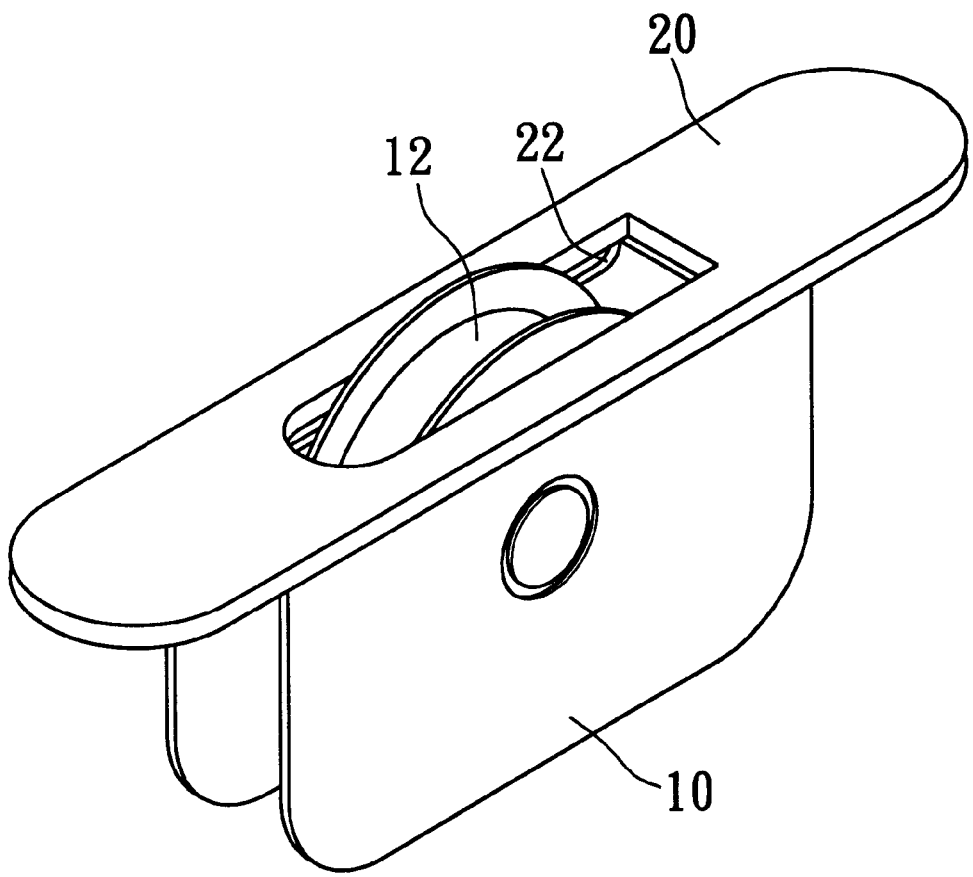
FIG. 2 shows a perspective view of the riveted structure for a pulley seat according to the present invention in an assembled form.
Figure 3:
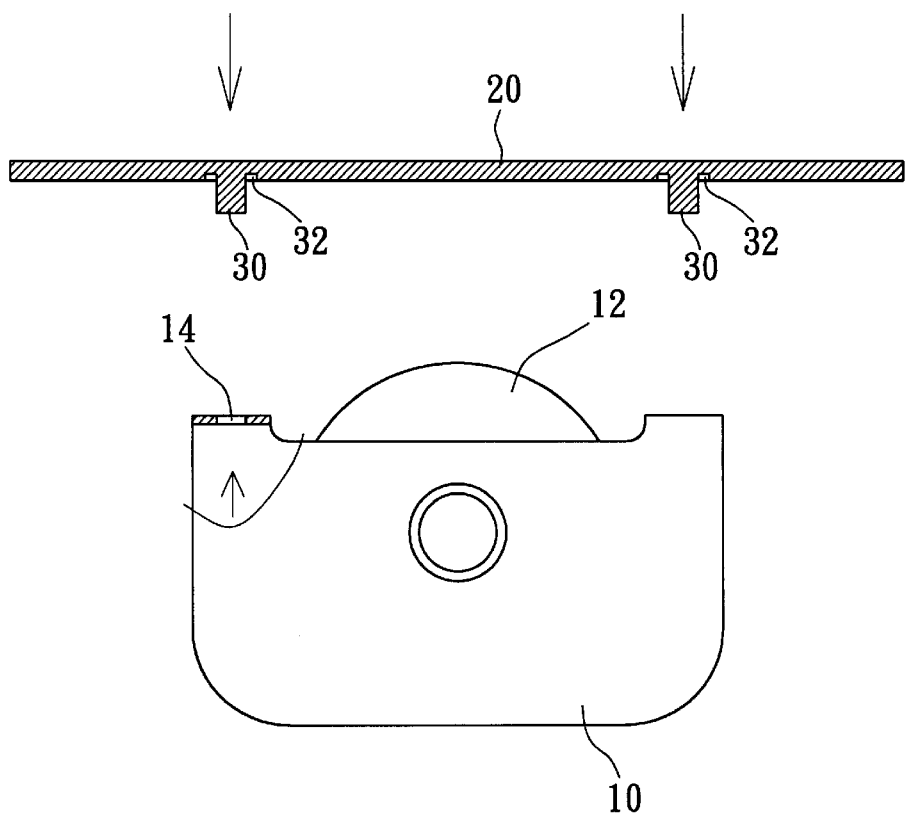
FIG. 3 shows an operational view of the panel to be riveted to the base according to the present invention.
Figure 4:
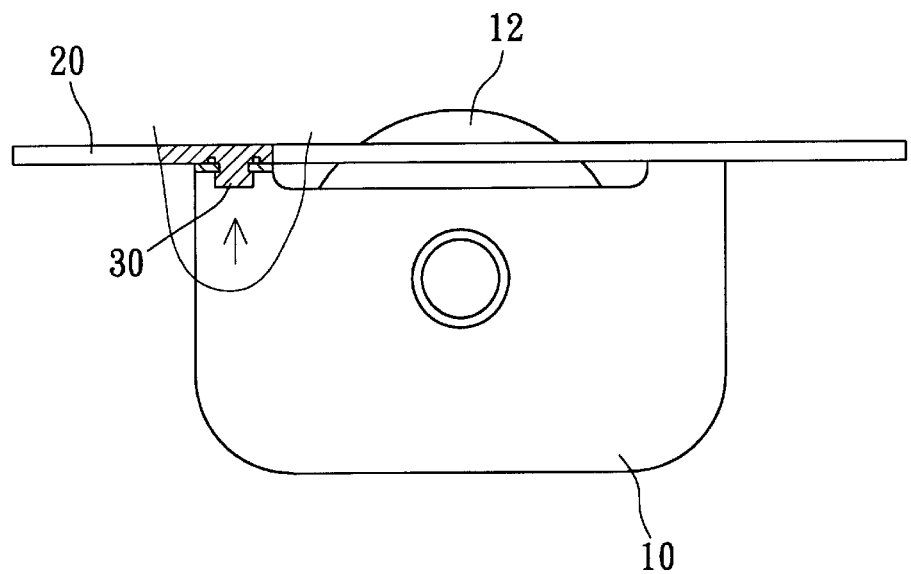
FIG. 4 shows a partial cross-sectional view of the panel to be riveted to the base in FIG. 3 in an assembled form.
Figure 5:
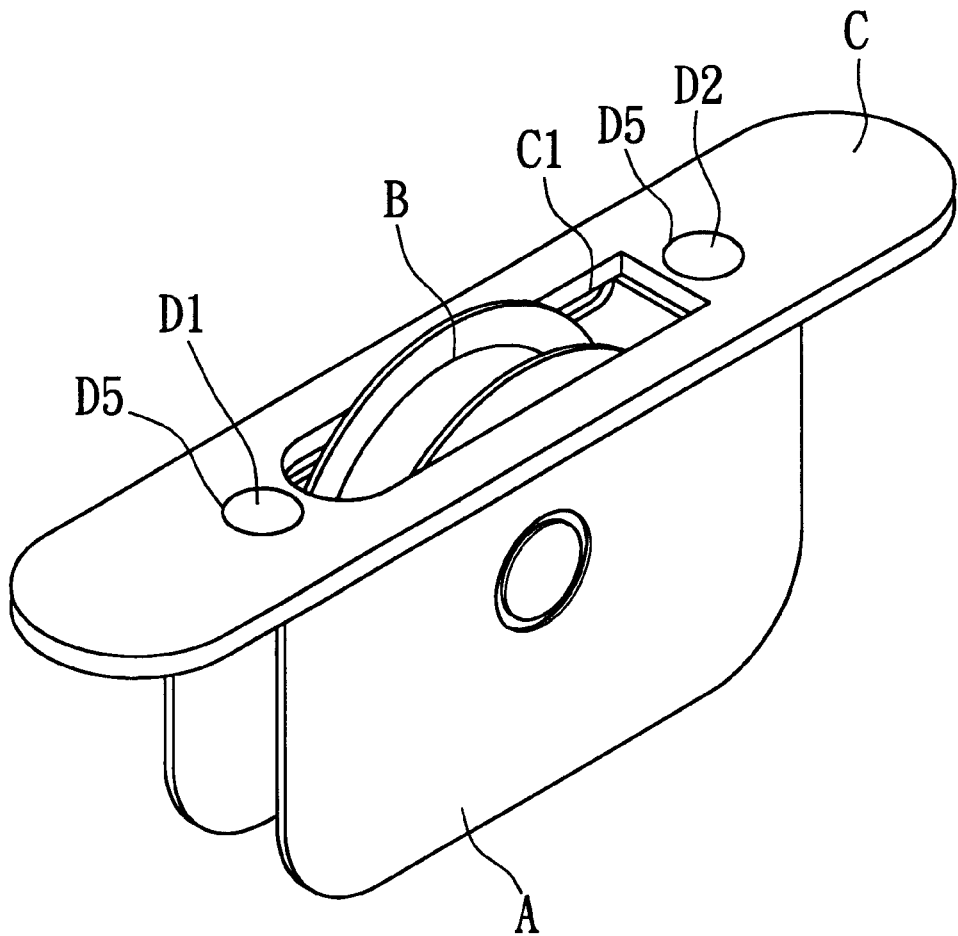
FIG. 5 shows a perspective view of a conventional riveted structure.
Figure 6:
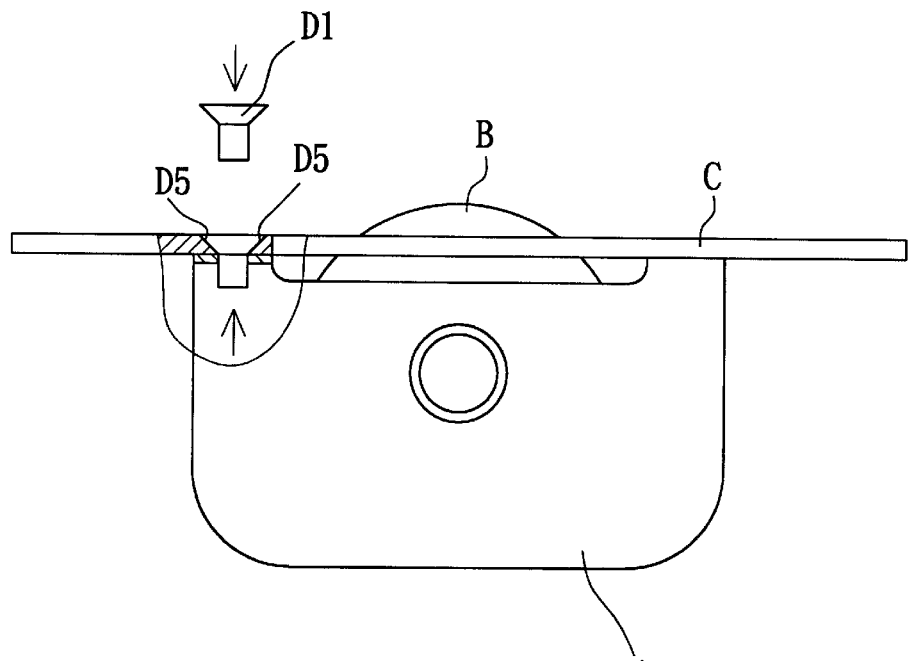
FIG. 6 shows a plan view of the conventional riveted structure in FIG. 5 in riveted condition.
Figure 7:
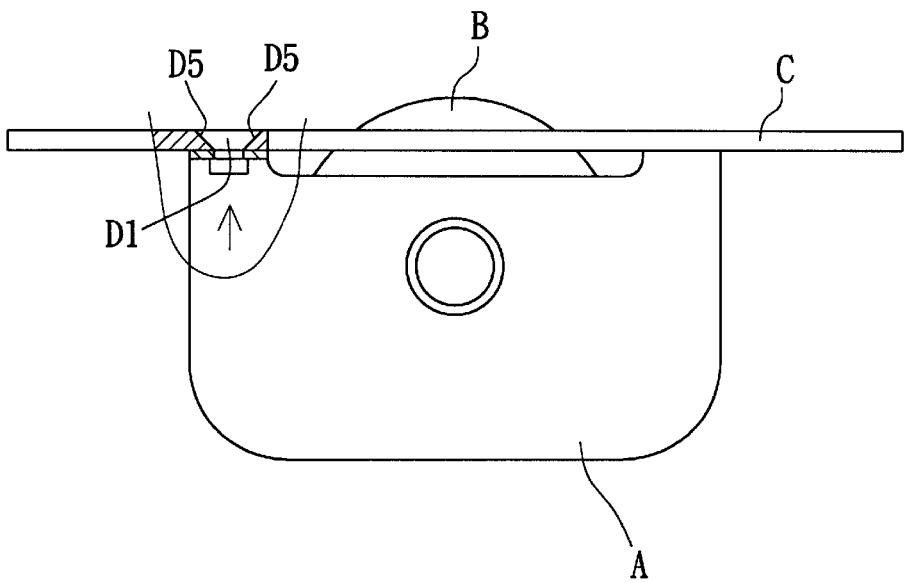
FIG. 7 shows a partial cross-sectional view of the known riveted structure in FIG. 6 after the rivet connection.
Figure 8:
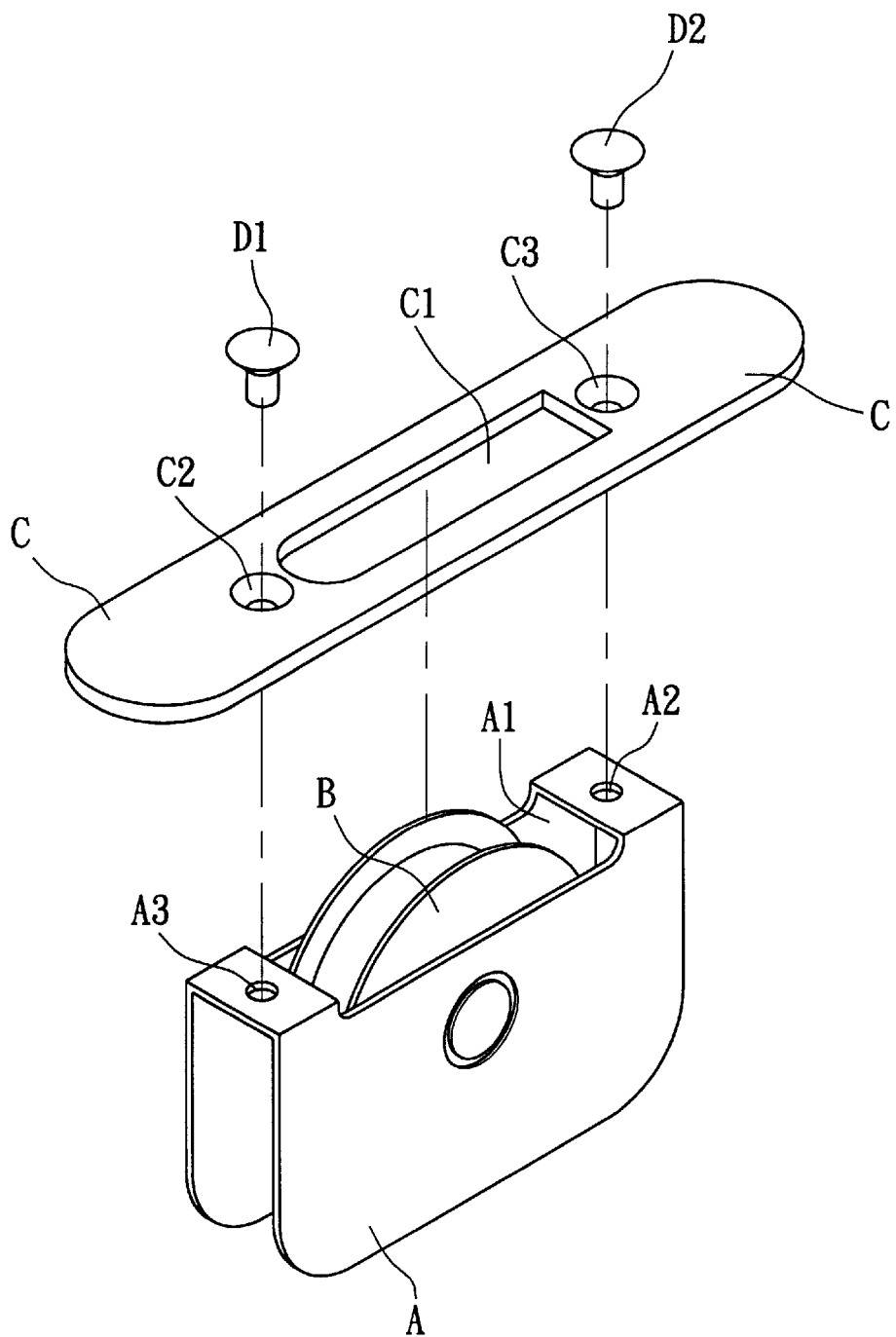
FIG. 8 shows an exploded view of the known riveted stricture in FIG. 5.

Referring to FIG. 1, the main characteristic of the rivet structure according to the described embodiment resides in that the two rivets 30(30) are integrally formed with the panel 20 when the panel 20 is manufactured. The material for the panel 20 is brass alloy and thus, the two rivets 30 (30) have an elongation characteristic. Furthermore, the surface of the panel 20 is planar and there is no trace of the rivet connection thereon. Referring to FIG. 3 when the two rivets 30(30) are passed through the two apertures 14 (14) and are pressed, because of to their elongation characteristic, the two rivets 30 (30) are deformed and positioned on the underside of the apertures 14(14) (as shown in FIG. 4). In addition, when the two rivets 30(30) are pressed, part of the material thereof is extended and filled into the recess 32. Consequently, the connection between the panel 20 and base 10 is rigid and there is not a riveted trace therebetween as shown in FIG. 2).

While there is shown and described herein certain specific structures embodying the present invention, it will be apparent to those skilled in the art that various modification and rearrangements of the parts may be made without departing from the spirit and scope of the underlying inventive concept.

What is claimed is:

1. A riveted structure for a pulley seat, comprising:

a base pivotally connected to a pulley, said base is provided with an aperture on an upper surface of each of two sides thereof, and a panel with an elongated through hole at a center thereof, said panel covers said base with a portion of said pulley extending through said through hole; wherein two rivets are integrally formed on an underside of said panel, said rivets passing though said apertures in said base, such that when said rivets are pressed, said rivets are deformed beneath a lower surface of said sides of said base, such that said panel and said base are securely affixed to each other, and said rivets are covered by said base and said panel, and wherein an annular recess is provided around each rivet so that when said rivets are pressed, deformed material of said rivets fills said recesses.

* * * * *